(12) United States Patent
Shimizu et al.

(10) Patent No.: US 7,308,960 B2
(45) Date of Patent: Dec. 18, 2007

(54) VEHICLE DRIVE TRAIN UNIT AND VEHICLE DRIVE TRAIN SYSTEM

(75) Inventors: Hisaya Shimizu, Tokyo (JP); Takehiko Kowatari, Tokyo (JP); Kousaku Oono, Tokyo (JP); Tatsuyuki Yamamoto, Tokyo (JP); Toshiyuki Innami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 296 days.

(21) Appl. No.: 10/815,699

(22) Filed: Apr. 2, 2004

(65) Prior Publication Data

US 2004/0195016 A1    Oct. 7, 2004

(30) Foreign Application Priority Data

Apr. 4, 2003  (JP)  ............................ 2003-101746

(51) Int. Cl.
*B60K 1/00* (2006.01)
(52) U.S. Cl. ................... 180/65.4; 180/65.1; 180/65.2; 903/902; 903/903; 903/916
(58) Field of Classification Search ............... 180/65.1, 180/65.2, 65.4; 903/902, 903, 916
See application file for complete search history.

(56) References Cited

U.S. PATENT DOCUMENTS

| | | | | |
|---|---|---|---|---|
| 4,438,342 A | * | 3/1984 | Kenyon | 290/45 |
| 4,923,025 A | * | 5/1990 | Ellers | 180/65.2 |
| 5,346,031 A | * | 9/1994 | Gardner | 180/179 |
| 5,927,417 A | | 7/1999 | Brunner et al. | |
| 5,984,034 A | * | 11/1999 | Morisawa et al. | 180/65.2 |
| 6,059,064 A | * | 5/2000 | Nagano et al. | 180/243 |
| 6,306,056 B1 | * | 10/2001 | Moore | 475/5 |
| 6,332,504 B1 | | 12/2001 | Adds | |
| 6,334,498 B1 | | 1/2002 | Morisawa et al. | |
| 6,383,114 B1 | * | 5/2002 | Hoshiya et al. | 477/2 |

(Continued)

FOREIGN PATENT DOCUMENTS

EP    1 018 451 A1    7/2000

(Continued)

OTHER PUBLICATIONS

European Search Report dated Mar. 17, 2006 (Three (3) pages).

(Continued)

*Primary Examiner*—Christopher Bottorff
*Assistant Examiner*—John D Walters
(74) *Attorney, Agent, or Firm*—Crowell & Moring LLP

(57) ABSTRACT

A vehicle drive train and drive train system is provided to simplify wire harness including power cables and reduce power loss in an engine-motor hybrid vehicle drive train system. The drive train and system includes some wheels driven by an engine, and other wheels driven by a motorized machine. When the running load is large, for example, starting a vehicle or running on a climbing lane, the motorized machine is activated for driving wheels in order to assist the engine. When no motor assistances is needed (for example, in low to medium load running or deceleration), the motorized machine functions as a generator to convert mechanical energy from the wheels into electric energy. The motorized machine, inverter, capacitor device and controller are integrated into a unit and the unit is attached to a differential gear.

11 Claims, 3 Drawing Sheets

U.S. PATENT DOCUMENTS

| | | | |
|---|---|---|---|
| 6,435,296 B1* | 8/2002 | Arai | 180/243 |
| 6,484,832 B1* | 11/2002 | Morisawa et al. | 180/65.2 |
| 6,488,608 B2* | 12/2002 | Yamaguchi et al. | 477/3 |
| 6,540,642 B2* | 4/2003 | Tabata | 477/5 |
| 2002/0019284 A1* | 2/2002 | Aikawa et al. | 475/150 |
| 2002/0023789 A1* | 2/2002 | Morisawa et al. | 180/65.2 |

FOREIGN PATENT DOCUMENTS

| | | | |
|---|---|---|---|
| JP | 05-219607 | | 8/1993 |
| JP | 2000-224709 | | 8/2000 |
| JP | 2001-063392 | | 3/2001 |
| JP | 2001-253256 | | 9/2001 |
| JP | 2002-218601 | * | 2/2002 |
| JP | 2002-142310 | | 5/2002 |
| JP | 2002-218601 | | 8/2002 |
| JP | 2002-316547 | | 10/2002 |

OTHER PUBLICATIONS

Japanese Notice of Rejection, Aug. 9, 2005.

* cited by examiner

VEHICLE DRIVE TRAIN UNIT AND VEHICLE DRIVE TRAIN SYSTEM

This application claims the priority of Japanese Patent Document No. 2003-101746, filed Apr. 4, 2003, the disclosure of which is expressly incorporated by reference herein.

BACKGROUND OF THE INVENTION

The present invention relates to a vehicle drive train unit and a vehicle drive system. The unit and system are particularly to suitable for an engine-motor hybrid vehicle, in which some wheels are driven by engine and others are driven by a motor.

A hybrid four-wheel drive train system with an engine and a motor for driving the vehicle has been known. In the system, either a front drive axle or a rear wheel drive axle (here, for example, a front wheel drive axle, hereinafter also called "front wheels") is driven by an engine, while the other axle (for example, a rear drive axle, hereinafter also called "rear wheels") is driven by motor as needed.

In the system, a four-wheel drive mode, in which both an engine and a motor operate, is used when a running load is large (for example, in starting a vehicle or in a climbing a gradient). On the other hand, a two-wheel drive mode in which only the engine is operated, is used during normal running when the load is relatively small (low load running range).

A hybrid four-wheel drive train system uses a DC motor or AC motor to drive wheels. Conventionally, apart from a power supply for accessories (for example, 12 V or 14 V alternator and battery for ordinary vehicle electric components), a generator for a wheel drive motor (for example, an alternator capable of generating power of 50 V or more) and a high-voltage battery for the motor have been used to power the motor (for example, Japanese Patent Laid-Open No. 2001-253256). A generator and a high-voltage battery are used because a 12 V or 14 V battery for accessories (ordinary electric components, such as starter, light, and air conditioner) and an alternator suited to such a battery cannot supply enough power to drive the wheel drive motor.

When wheels are motor-driven to start the vehicle, at the time of engine start when the engine speed is low and the output power of the wheel drive motor alternator is low, the alternator turns a separately-excited mode in which field current is supplied from the battery for accessories or the motor battery to the field coil of the alternator to increase the output power of the alternator. This output power is used to drive the motor. After the vehicle velocity reaches a predetermined level (for example 20 km/h), the alternator for the wheel drive motor generates enough power to drive the motor and uses its own output power to power the field coil (self-excited mode).

Japanese Patent Laid-Open No. 2000-224709 discloses a technique that a high-voltage generator and a main battery for a wheel drive motor and an auxiliary battery for accessories are provided to the vehicle. The high-voltage generator or the main battery is used to power the motor. Furthermore a DC-DC converter converts high-voltage power (for example, 250 V-350 V) from the generator into low-voltage power (12 V or 24 V) which is then supplied to the auxiliary battery Japanese Patent Laid-Open No. 2001-63392 discloses a hybrid four-wheel drive train system that performs regenerative control by using a motor with a regenerative function (MG: motor-generator) as a means to drive, for example, rear wheels.

And when the vehicle is in braking, the motor (MG) functions as a generator for braking the vehicle, and regenerated energy from this MG is charged in a capacitor for the motor. The charged power in the capacitor is supplied to the MG so that the MG is used for auxiliary wheel drive control in starting or accelerating the vehicle on a normal or dry road surface of high coefficient of friction (high friction road).

Japanese Patent Laid-Open No. H5(1993)-219607 proposes the following drive train unit in an electric vehicle drive system. The unit comprises a translator, a motor and a differential gear where the translator and the motor are integrated into a unit, and the unit is directly attached to the differential gear which has a reduce function.

SUMMARY OF THE INVENTION

As explained above, in a conventional engine-motor hybrid vehicle drive train system, some wheels are driven by an engine and the other wheels, namely wheels not driven by the engine, are driven by a motor. In this type of hybrid vehicle drive train system, the motor is powered by the electric energy obtained (through the generator and battery) from the engine.

Therefore, the engine drive system and the motor drive system are provided with an electric connection, so that a power cable for connecting both the power systems is needed. As the power cable is longer, the cost is higher and power loss is larger.

Besides, since not only engine system components but also motor drive system components are required, the total number of components is larger and it is not easy to arrange them properly. In addition, more man hours of car arrangement are required and more power cables must be used. This is a problem to be solved in prior arts.

On the other hand, in an electric vehicle which does not use an engine as a driving source, electric energy from a motor which powers the vehicle is supplied from a battery. The battery must be charged by an external charging facility.

An object of the invention is to simplify wire harness including power cables and to reduce power loss. Another object of the invention is to provide a vehicle drive train unit and a vehicle drive train system which use a smaller number of components and thereby facilitate arrangement of components and vehicle assembly. A further object of the invention is to provide an engine-motor hybrid vehicle drive train system which obtains electric energy to drive wheels without receiving power from an external charging facility or engine system generator.

The present invention proposes a vehicle drive train unit or vehicle drive train system as described next.

In a vehicle drive train system provided with a motorized machine for driving wheels, the motorized machine is powered only by the energy obtained from the wheels. For example, in a vehicle drive train system in which some wheels are driven by an engine and the other wheels are driven by a motorized machine, when the running load is large (for example, in starting the vehicle or running it on a climbing gradient), the motorized machine is activated as a motor for driving wheels in order to assist the engine drive system. While a vehicle runs, there is a range in which no motor assistance is needed (for example, in low to medium load running or deceleration). While no motor assistance is needed, the motorized machine functions as a generator to convert mechanical energy from the wheels into electric energy.

The motorized machine is used as a generator, for example, by making use of regenerative function at the braking time of the vehicle. The electric energy thus obtained is stored; this electric energy is used to activate the motorized machine as a motor depending on the running condition. In addition, the motorized machine may be activated as a generator even in a normal load running condition depending on the situation. For instance, in case of having an electric brake, because of storing always the amount of electric energy required to activate the electric brake, the stored amount of electric energy may be monitored, and the motorized machine is used as generator as needed.

The important point in the present invention is that even in an engine-motor hybrid vehicle drive train system, its motor drive system can get electric energy without relying on the generator or battery of the engine system. In other words, the mechanical energy of motor-driven wheels is converted into electric energy and this electric energy is stored.

Moreover, the present invention proposes a unit which combines a motorized machine for driving wheels and a capacitor device. Also, the invention proposes a vehicle drive train unit which integrally combines the unit with a differential gear.

DETAILED DESCRIPTION OF THE INVENTION

Next, one preferred embodiment of the present invention will be described referring to the accompanying drawings.

Figure 1:
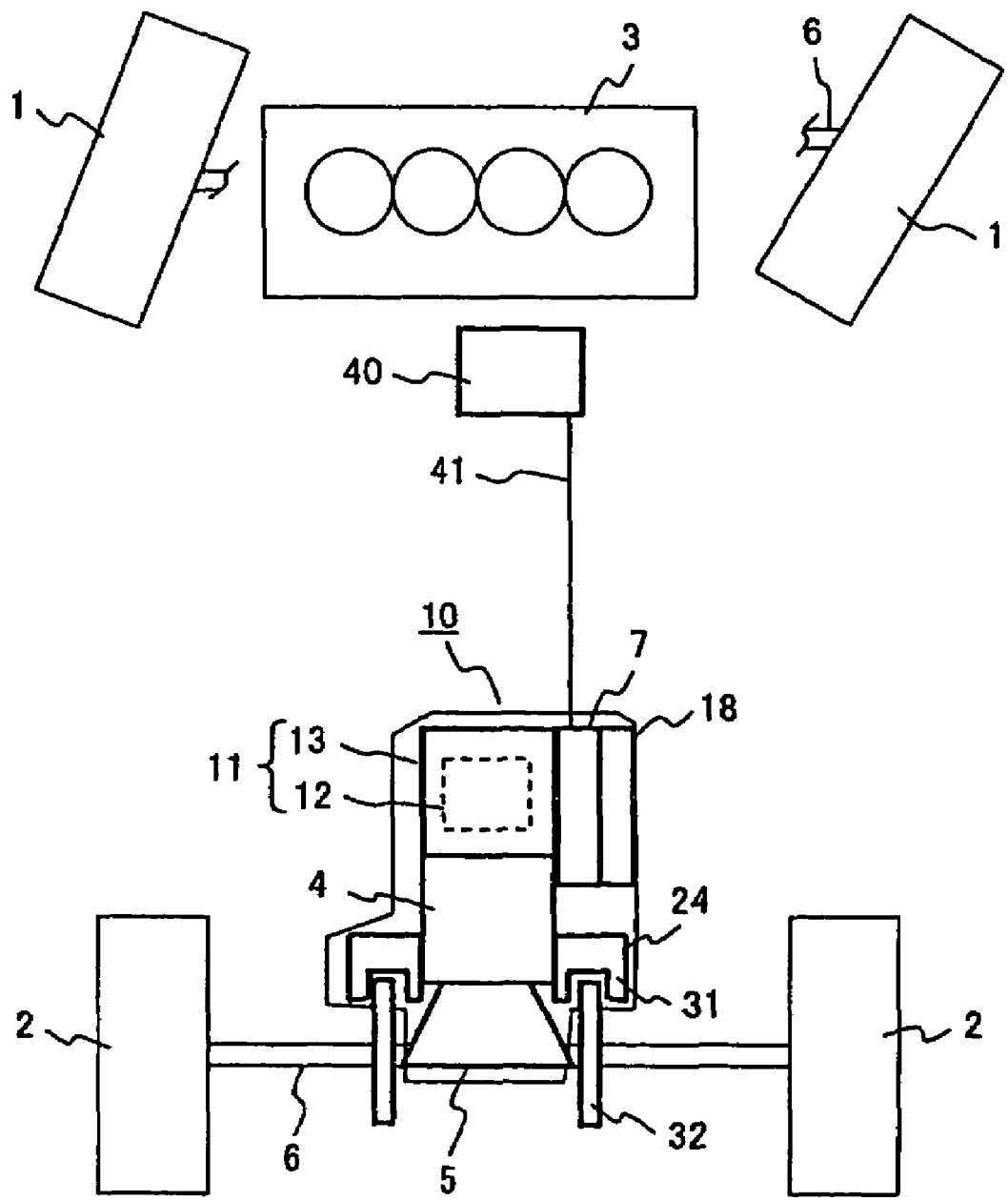
FIG. 1 is a schematic view of a vehicle drive train system according to an embodiment of the present invention.
Figure 2:
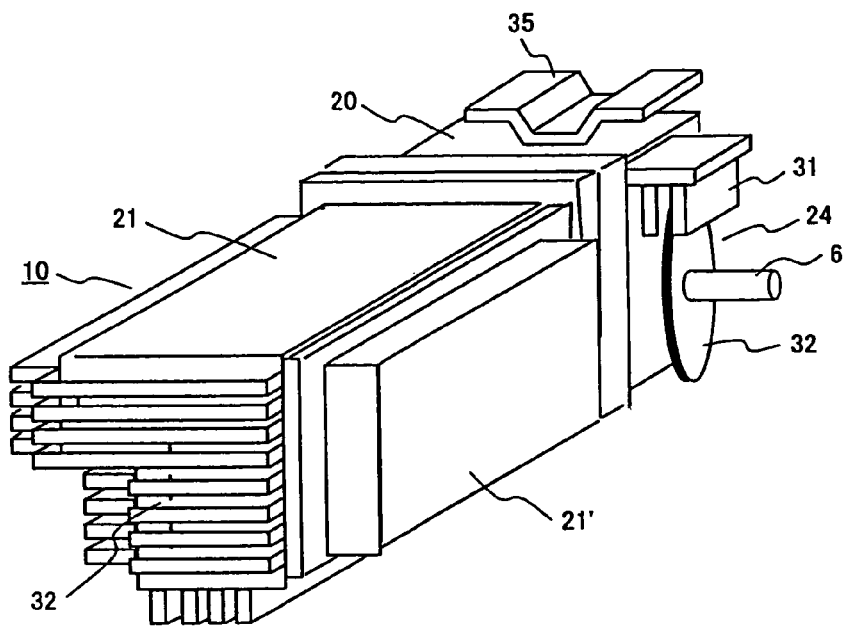
FIG. 2 is a schematic perspective view of a vehicle drive train unit used in the above embodiment.
Figure 3:
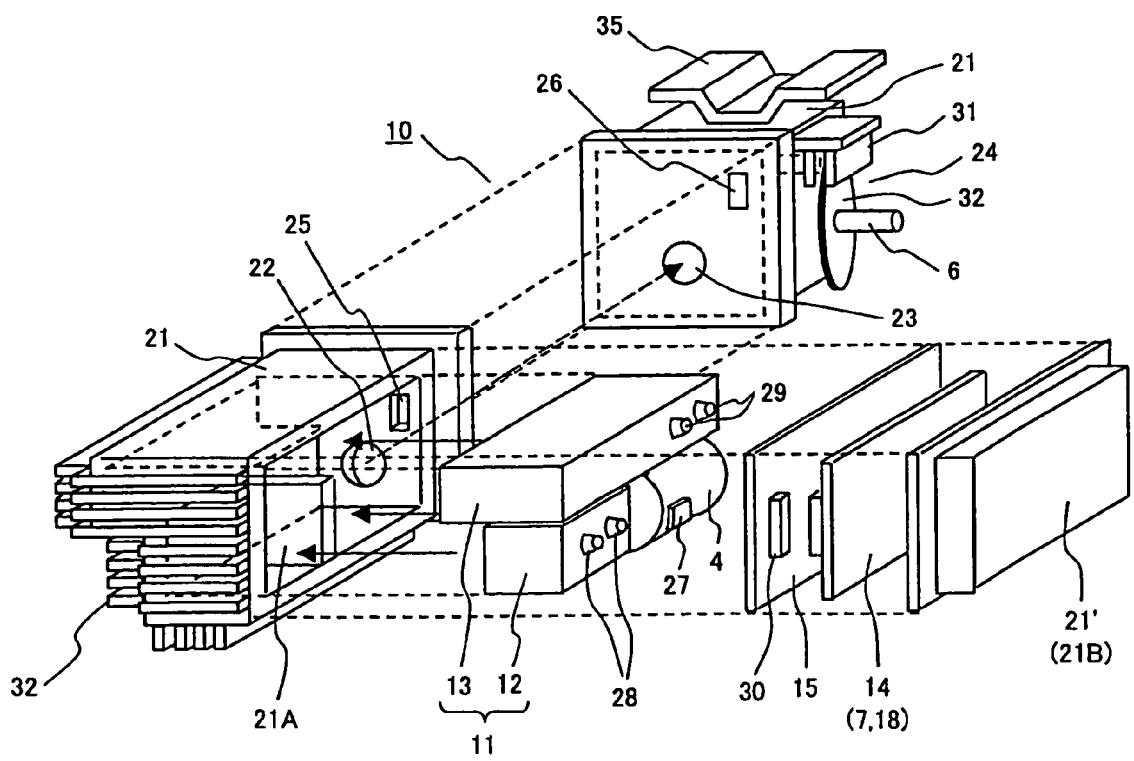
FIG. 3 is an exploded perspective view of the above vehicle drive train unit.

FIG. 1 schematically shows a vehicle drive train system according to this embodiment; FIG. 2 is a schematic perspective view of a vehicle drive train unit used in the system; and FIG. 3 is an exploded perspective view of the unit.

In FIG. 1, reference numeral 1 represents front wheels and 2 rear wheels.

Either the front wheels 1 or the rear wheels 2 are driven by an engine 3 and the other wheels are driven by a motorized machine (electric rotary machine: motor or motor-generator) 4. Here, the engine 3 may be of any type and it is assumed that the front wheels 1 are driven by the engine 3 and the rear wheels 2 are driven by the motorized machine 4. Here, the motorized machine 4 is referred to as an MG because it is a motor-generator in this case.

The power of the engine 3 is transmitted to a transmission (not shown) and a front wheel axle (not shown) to drive the pair of front wheels 1.

The power of the MG 4 is transmitted through a clutch and a differential gear 5 to a rear wheel axle 6 to drive the rear wheels 2.

In driving the rear wheels 2, the MG 4 is used as a motor as needed (depending on the running condition).

In this embodiment, the MG 4 is, for example, a three-phase AC motorized machine which is driven by an inverter 7. A DC motor may be used instead.

The driving force which the MG 4 functions as a motor (for power running) or the power which the MG 4 generates as a generator (for regeneration) is controlled, for example, by controlling a current applied to a field coil thereof.

The inverter 7 which drives the MG 4 may employ either the PWM or PAM control method. When the MG 4 is used as a motor, the voltage applied to the motor and its frequency are controlled, so that the torque and speed, which respectively depend on load and a control command, can be attained.

The power of the engine 3 is transmitted through a pulley (not shown) and a V belt (not shown) to an alternator. The alternator functions as a power supply for engine system electric components (accessories) and an auxiliary battery (not shown) for accessories.

A major feature of the vehicle drive train unit 10 in this embodiment is that it is independent from the engine and its electric system. The vehicle drive train unit 10 drives one pair of wheels (for example, the rear wheels 2) independently from the engine drive system.

The vehicle drive train unit 10 converts the mechanical energy of wheels 2 other than wheels 1 rotated by the engine 3 into electric energy, and stores (charges) the electric energy in its capacitor device 11. The stored electric energy is reconverted into mechanical energy as needed, which is used to rotate the wheels 2 (wheels other than the wheels 1 rotated by the engine 3).

In this embodiment, the capacitor device 11 comprises a battery 12 and a capacitor (condenser) 13. Also, the capacitor device 11 may only comprise either a battery or a capacitor.

The vehicle drive train unit 10 is mounted integrally with a differential gear 5 which transmits the motive power of the unit to the wheels.

According to this embodiment, the vehicle drive train unit 10 integrates the MG 4, a capacitor device 11 (battery 12 and capacitor 13), a translator for electric power (inverter) 7, a controller 18 which controls the inverter 7 (the controller 18 is mounted on a board 14 together with the inverter 7 as shown in FIG. 3) with the differential gear 5 into a single unit.

The structure of the vehicle drive train unit 10 is explained referring to FIGS. 2 and 3.

The unit 10 has a first housing 20 which houses the differential gear 5, and a second housing 21 which houses the MG 4, the capacitor device 11 (battery 12 and capacitor 13) and circuit board 14 (inverter 7 and its controller 18).

These housings 20 and 21 are joined integrally. The second housing 21 is divided into two parts: a first chamber 21A and a second chamber 21B. For example, the first chamber 21A constitutes a main body of the housing 21, and the second chamber 21B constitutes a lid 21' of the housing 21. The housings 20 and 21 are made of metal.

The main body and lid 21' of the housing 21 are joined, a synthetic resin wiring board 15 partitions the housing 21 into the first chamber 21A and the second chamber 21B in an airtight manner. The MG 4 and capacitor device 11 are housed in the first chamber 21A, and the circuit board 14 having the inverter 7 and controller 18 is housed in the second chamber 21B.

In the capacitor device 11, the capacitor 13 and the battery 12 are housed in layers in the first chamber 21A. The MG 4 is located in front of the battery 12. The output shaft of the MG 4 is engaged with the differential gear 5 through a hole 22 in a side wall of the housing 21 and a hole 23 in the housing 20.

The housing 20 includes an electric brake 24 which is powered by the capacitor device 11. The electric brake 24 is an electromagnetic type brake in which brake pads 31 are activated by a solenoid to pinch a brake disk 32. However, the present invention is not limited thereto. The brake 24 may be in any other form as far as it is electrically operated.

Figure 4:
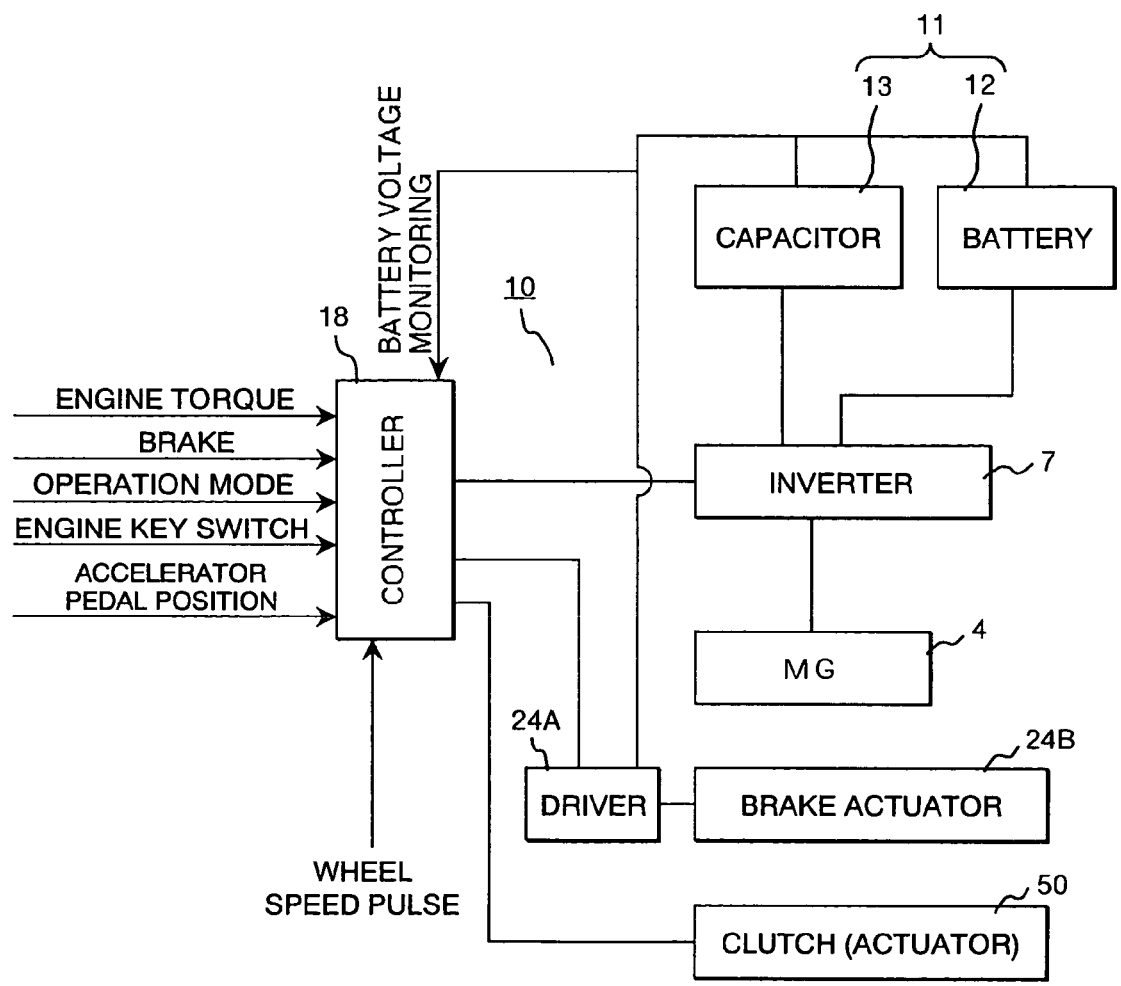
FIG. 4 is a block diagram of a control unit according to an embodiment of the present invention.

The electric brake 24 is powered through a power cable (not shown) from the capacitor device 11 which runs through guide holes 25 and 26 in the housings 20 and 21 into a drive circuit (driver 24A in FIG. 4).

In this embodiment, the capacitor 13, the battery 12, the wiring board 15, the MG 4 and the circuit board 14 are closely located so that their terminals and connectors can be directly connected by inserting without wiring. In FIG. 3, reference numeral 27 is MG terminals, 28 is battery terminals, 29 is capacitor terminals, and 30 is a connector.

The lid 21' of the housing 21 is made of a material of high coefficient of thermal conductivity and also serves as a radiator for the circuit board 14. In the housing 21, radiating fins 32 are provided in order to radiate heat from the capacitor device 11. Reference numeral 35 represents a bracket for attachment to the vehicle.

According to this embodiment, as shown in FIG. 1, the front wheels are driven by the engine system, while the rear wheels are driven by the motor system when the running load is large. When the running load is large such as starting of the vehicle or running on a climbing a gradient, electric energy is sent from the capacitor device 11 to the inverter 7, where three-phase AC conversion takes place and the resulting AC power drives the MG 4 to rotate the rear wheels 2.

In the two-wheel drive mode in which only the engine is activated (the front wheels are driven in this case) and the motor drive system for the rear wheels is inactivated, the MG 4 functions as a generator in the following case.

When, during deceleration of the vehicle, the MG 4 is used as a generator for regenerative braking, regenerated electric energy is stored to the capacitor device. Even while the vehicle is running in a normal load condition, storage of electric energy is monitored, and the motorized machine is activated as a generator as needed (for example, when electric energy is insufficient).

In the generator mode, three-phase AC power generated in the MG 4 is converted through the inverter 7 into DC power and sent to the capacitor device 11.

FIG. 4 is a block diagram showing a motorized vehicle drive train unit according to this embodiment.

The capacitor 13 and battery 12 are connected with the inverter 7.

The controller 18 receives a command from an engine control unit 40 (FIG. 1), and controls the inverter 7 of the drive train unit 10, the electric brake 24 and a clutch actuator 50. The clutch 50 is an actuator which actuates the clutch between the MG 4 and differential gear 5. The engine control unit 40 gives information on the operational condition of the engine (for example, on or off the engine key switch, engine torque, brake, vehicle operation mode and so on) to the controller 18 of the motor drive system. This information is sent through a signal line 41 (FIG. 1) to the controller 18.

As the controller 18 receives information that the engine key switch is turned on, it makes the motorized drive train unit 10 stand by for operation. Based on engine torque (load information) sent from the engine control unit 40, it decides whether the MG 4 should function either as a motor or as a generator, and controls the inverter 7 according to the decision.

As stated above, it is when the running load is large (for example, in starting the vehicle or running it on a climbing gradient) that the MG 4 is activated as a motor. The driving force of the motor depends on the amount of pedal operation.

As a brake information is received, the MG 4 functions as a generator to perform regenerative braking. The regenerated energy obtained by regenerative braking is converted by the inverter 7 into DC energy, which is charged to the capacitor 13 and the battery 12.

In regenerative braking, if the braking force is insufficient, the controller issues a command for activating the electric brake 24. In this case, the driver 24A of the electric brake 24 is controlled to activate the brake actuator 24B.

In a normal (low to medium load) running condition, the MG 4 neither functions as a motor nor as a generator. However, when the capacitor device 11 is undercharged (below a prescribed level), shortage of charging is detected, and the MG 4 is activated as a generator as needed to recharge the capacitor device 11. When the MG 4 neither functions as a motor nor as a generator during running of the vehicle, the clutch is turned off in order to stop motor rotation and reduce friction loss.

In this embodiment, it is possible that a device with a voltage increasing/decreasing function (booster/transformer) is provided between the inverter 7 and the capacitor device 11. Thus, for power running, the voltage of the power from the capacitor device 11 is increased before being supplied to the MG 4, while for regeneration, the voltage of the power generated by the MG 4 is decreased before being supplied to the capacitor device 11.

According to this embodiment, the present invention brings about the following advantageous effects.

(1) Since the motorized vehicle drive train unit 10 is electrically independent from the electric power system of the engine drive system, a power cable for connecting the motor and engine systems is no longer needed. Furthermore, in the motorized drive train unit 10, the wire harness for interconnection of the capacitor device 11, MG 4, inverter 7 and electric brake 5 can be simplified. As a consequence, wiring cost including power cable cost is reduced and power loss in wiring is decreased.

Therefore, when the MG is used as a motor, driving power loss is reduced, and when it is used as a generator, transmission loss is minimized and charging efficiency is increased.

The electric brake can be easily powered by an adjacent power source.

Noise can be reduced in the power and drive command signal lines.

Since elements of the motorized vehicle drive train system are integrated into a single unit, a compact, lightweight motorized vehicle drive train system is realized at low cost, and it is easy to install the unit in the vehicle. For instance, motor drive components are integrated into a unit and the unit may be detachably attached to the differential gear. Particularly, since the need for a power cable can be eliminated, it is possible to install the vehicle drive train unit after assembly.

So far, the motor drive system has been powered by the battery in the engine system. On the other hand, according to the present invention, three-phase power is generated by the battery, and capacitor or MG as components of the vehicle drive train unit. Therefore, the electric brake is fail-safe.

Since the vehicle can be run in the hybrid four-wheel drive mode as needed (for example, when it is to be started), slip of the vehicle at start can be prevented. As regenerated energy is used as electric energy for driving the vehicle, saving energy and reduction in exhaust gas are realized. In a diesel engine, black smoke (diesel particulates) in exhaust gas can be reduced.

(5) The housing 21 of the motorized vehicle drive module is partitioned into the first and second chambers by the synthetic resin wiring board 30 in an airtight manner; and the first chamber 21A houses the MG 4 and capacitor device 11; and the second chamber 21B houses the controller 18. Silicon gel as an insulating sealant is filled up in the second chambers. The structure of the embodiment prevents the silicon from entering the space of power system of the first chamber. Thereby, it prevents a silicon gel ingredient from causing contamination due to spark discharge of the power system.

(6) The vehicle drive train unit 10 houses its electric components in a unified manner, and the components share a cooling means. This simplifies the structure of the cooling system, improves its efficiency and contributes to cost reduction.

(7) Since the housing of the vehicle drive train unit 10 is made of metal, the electric components in the unit are protected from electromagnetic interference by an external machine thanks to its electromagnetic shield effect.

(8) Since the capacitor device 11 uses both battery 12 and capacitor (condenser) 13, its structure can be charged quickly by the MG 4 in case of shortage of charging, because the capacitor 13 is more effectively boost-charged than the battery 12. Since the capacitor 13 can be rated at higher voltage and larger current, a larger motor torque can be attained at start of the vehicle.

(9) When this embodiment is applied to a truck with trailer, it offers the following advantage. In a conventional engine-driven truck with a trailer, as a propeller shaft cannot be extended from engine to the trailer, it is difficult to drive wheels of the trailer side by the engine. Also, if a conventional engine-motor hybrid vehicle drive train system is applied to a truck with a trailer, long power cables are required for connection between the engine system generator and the motor. By contrast, according to this embodiment, when the motorized vehicle drive train unit 10 is applied to a trailer, the engine drive system and the motor drive system are electrically independent from each other and the above problem is solved. Even in a vehicle which allows separation of its trailer, the embodiment can be applied easily.

(10) The electric brake 24 can electronically control its braking force for the right and left wheels separately. It can also perform regeneration cooperative control.

(11) Since the motorized drive train unit 10 is attached to the differential gear, suspension rigidity may be lower and unsuspended weight may be smaller than when the motorized machine is mounted around the suspension.

In this embodiment, the vehicle drive train unit and the differential gear are integrally joined. However, the present invention is not limited thereto. For instance, a vehicle drive train unit which incorporates a motorized machine and a capacitor device, or a translator to electric power and a controller in addition to them may be mounted on each of the wheels which are not driven by the engine.

According to the present invention, in an engine-motor hybrid vehicle drive train system, wire harness including power cables can be simplified and power loss can be substantially reduced.

What is claimed is:

1. A vehicle drive train unit used for a vehicle in which some wheels are driven by an engine and other wheels are driven by a motorized machine; the unit comprising:
    a motor-generator used for the motorized machine,
    a capacitor device including at least one of a battery and a capacitor, and a translator for electric power;
    wherein the motor-generator has a regenerative function for converting mechanical energy of the wheels other than wheels driven by the engine into electric energy during regenerative braking and storing the electric energy into the capacitor device, and a motor function for driving the wheels other than wheels driven by the engine, during power running, with electric power from the capacitor device by way of the translator,
    wherein the motor-generator, the capacitor device and the translator are integrated into a single assembly, being housed in a housing together; and
    wherein the assembly is independent of an electric system of the engine, and integrally joined with another housing for a differential gear for transmitting the power of the motor-generator to the wheels such that the assembly is attached to the vehicle together with the differential gear.

2. The vehicle drive train unit according to claim 1, wherein the unit is detachably attached to the vehicle.

3. The vehicle drive train unit according to claim 1, further comprising
    a controller for controlling the translator;
    wherein the motor-generator, the capacitor device, the translator and the controller are integrated into the single assembly.

4. The vehicle drive train unit according to claim 1, further comprising an electric brake which is powered by the capacitor device, wherein the electric brake is integrally built in the assembly.

5. The vehicle drive train unit according to claim 1, wherein the motorized machine is an AC motor-generator; the translator is an inverter; and a device with a function of increasing and decreasing voltage is provided between the inverter and the capacitor device.

6. The vehicle drive train unit according to claim 1,
    wherein the assembly has a first housing which houses a differential gear and a second housing which houses the motorized machine, the capacitor device, the translator and a controller,
    wherein these housings are joined with each other,
    wherein the second housing is partitioned into a first chamber and a second chamber by a plastic wiring board in an airtight manner, the first chamber houses the motorized machine and the capacitor device, and the second chamber houses the controller.

7. An engine-motor hybrid vehicle drive train system which drives either front wheels or rear wheels by an engine, and the other wheels by a motor as needed, wherein a drive part which is operated by the motor is constituted by a vehicle drive train unit as described in claim 1.

8. A vehicle drive train system which drives at least some wheels by a motor, characterized by having a vehicle drive train unit as described in claim 1.

9. An engine-motor hybrid vehicle drive train system which drives either front wheels or rear wheels by an engine, and the other wheels by a motor as needed, wherein a drive part which is operated by the motor is constituted by a vehicle drive train unit as described in claim 1.

10. The vehicle drive train system which drives at least some wheels by a motor, having a vehicle drive train unit as described in claim 1.

11. The vehicle drive train system according to claim 1, the assembly and the differential gear are joined with each other so as to be arranged in the longitudinal direction of the vehicle.

* * * * *